United States Patent [19]

Tosswill

[11] 4,262,207
[45] Apr. 14, 1981

[54] NEAR FIELD OR FAR FIELD IMAGING APPARATUS WITH IMPROVED RESOLUTION

[75] Inventor: Christopher H. Tosswill, Sturbridge, Mass.

[73] Assignee: Galileo Electro-Optics Corp., Sturbridge, Mass.

[21] Appl. No.: 31,835

[22] Filed: Apr. 20, 1979

[51] Int. Cl.³ .......................... G21K 1/00; G01T 1/20
[52] U.S. Cl. ................................... 250/505; 250/363 S
[58] Field of Search ............... 250/363 S, 366, 203 R, 250/505; 356/147

[56] References Cited

U.S. PATENT DOCUMENTS

| 3,866,047 | 2/1975 | Hounsfield | 250/366 |
| 3,934,142 | 1/1976 | Hounsfield | 250/366 |
| 3,946,234 | 3/1976 | Hounsfield | 250/363 S |
| 4,160,167 | 7/1979 | Weiss et al. | 250/366 |

Primary Examiner—Alfred E. Smith
Assistant Examiner—Carolyn E. Fields

[57] ABSTRACT

In imaging apparatus comprising a slit collimator, means for imparting to the collimator a basic movement through a succession of different positions relative to a source of radiation, detector means for providing measurements of the radiation passing through the collimator in each of the positions, and means for processing data from the succession of measurements to gain information about the source, that improvement comprising means for superimposing upon the basic movement of the collimator a cyclic lateral movement of the collimator and the detector means transverse both to the direction of radiation transmission through the collimator and to the walls of the collimator defining the slits, and means for making a succession of such measurements during each cycle of the lateral movement.

6 Claims, 4 Drawing Figures

$n \geq i \geq 1$
$m \geq j \geq 1$

NEAR FIELD OR FAR FIELD IMAGING APPARATUS WITH IMPROVED RESOLUTION

BACKGROUND OF THE INVENTION

This invention relates to obtaining information about radiation sources.

My U.S. Pat. No. 4,090,080 (hereby incorporated by reference) describes a device useful for mapping a nearby source ("near field") of radiation, e.g., a gamma ray emitting radioisotope located in a patient undergoing a medical procedure. A collimator having slits defined by pairs of parallel, radiation absorbing sheets, is rotated about its axis, and detectors are arranged to measure the radiation passing through each slit in each of many angular positions of the collimator. Simultaneous equations are then solved, applying known computer techniques, to generate the desired map.

As is mentioned in said patent, honeycomb-like channel collimators have also been used for such mapping; a single picture is taken with the collimator stationary, each channel viewing a different portion of the source. Channel collimators have also been used in x-ray astronomy, where the source is so distant ("far field") that all channels receive the same radiation flux; the collimator is mounted to pivot about orthogonal axes in a raster scan pattern.

In my pending U.S. patent application Ser. No. 921,200, filed July 8, 1978 to be issued as U.S. Pat. No. 4,205,228 (hereby incorporated by reference) there is described a far field imaging device. A collimator is rotated about its own axis while that axis moves about a fixed axis pointing toward the overall field of view of the collimator. Radiation from the source is transmitted through the collimator during each of its revolutions about its axis. The position of the collimator relative to its axis, and the angular position of the collimator axis relative to the fixed axis, at the time of each such transmission, define a response plane. Computerized data reduction is used to find the intersection of the response planes, which will be a line pointing precisely at the source. For multiple sources, there are a corresponding number of intersections.

In my pending U.S. patent application Ser. No. 961,671, filed Nov. 17, 1978 (hereby incorporated by reference), there is disclosed another far field imaging device. The collimator has a multiplicity of portions, the transmissivities of the portions to radiation reaching the collimator from a given source being different from portion to portion for a given orientation of the collimator; these transmissivities are varied over time, and radiation passing through each portion is detected for successive values of its transmissivity. In the disclosed embodiment the collimator has slits defined by radiation absorbing sheets which lie along planes intersecting in a common focal line, and the transmissivities of the slits are varied over time by rotating the collimator about an axis pointing toward its field of view and perpendicular to the focal line.

The above systems have in common, in their preferred embodiments, movement of a slit collimator through a succession of different positions relative to the source, measuring the radiation passing through the collimator in its successive positions, and processing of the data from the succession of measurements to gain information about the source.

SUMMARY OF THE INVENTION

I have discovered that spatial resolution can be improved in such a system by superimposing upon the movement of the collimator a lateral movement of the collimator (with its detectors) transverse both to the direction of transmission through the collimator and to the walls defining the slits. In some embodiments the lateral motion is at a higher frequency than that of the basic collimator motion, and the basic motion is halted while the lateral motion takes place. In other embodiments the basic motion is at the higher frequency, and the lateral motion is halted while the basic motion takes place. Plural measurements are made during each cycle of the lateral motion. The total excursion of the lateral motion is at least the center-to-center distance from one slit to the next. In the near field system the lateral motion is straight line movement perpendicular to the slit walls; in the far field systems it is angular movement about an axis perpendicular to the direction of transmission through the slits.

We turn now to a description of preferred embodiments of the invention, after first briefly describing the drawings.

DESCRIPTION OF THE PREFERRED EMBODIMENTS

Figure 1:
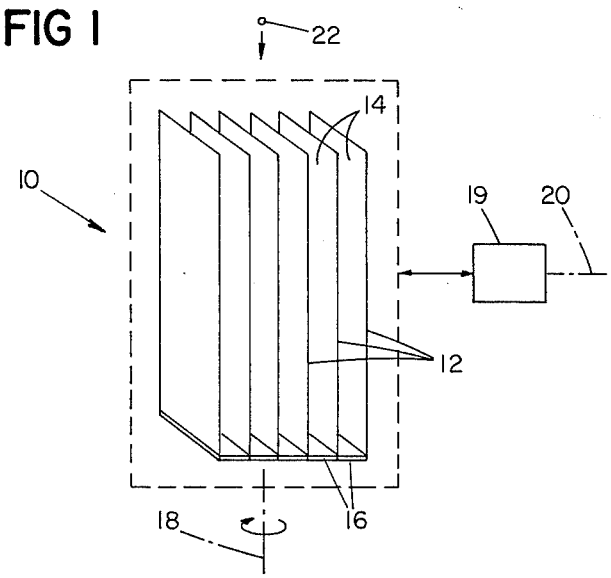
FIG. 1 is a diagrammatic view showing the invention embodied in a system of the type disclosed in U.S. Pat. No. 4,090,080.

Referring to FIG. 1, collimator 10 has a stack of spaced sheets 12 defining slits 14, and a detector 16 at the end of each slit, all as described in detail in U.S. Pat. No. 4,090,080. The collimator rotates about axis 18 for 180° in small steps (3.6° each in the embodiment described in the patent). After each such step rotation is stopped and the collimator is moved (using any suitable drive 19) laterally along axis 20, which is perpendicular both to axis 18 and to the planes of sheets 12. Several times during the lateral motion the radiation (from source 22) reaching each detector 16 is measured. The total excursion of the collimator along axis 20 is equal to the center-to-center distance between adjacent slits 14 (although a larger excursion, e.g., 3 times the center-to-center distance, might be useful for statistical averaging) and the collimator is returned to its original position along axis 20 before the next step of rotation about axis 18 is taken. If, say, m measurements (3 m, e.g., if the excursion is 3 times the center-to-center distance) are taken during each excursion along axis 20 (and at equally spaced positions of the collimator along axis 20), then a total of 50 m measurements will have been taken when the collimator has rotated 180° about axis 18. These measurements are processed in the general manner set forth in the patent to yield the desired information about source 22, but with much higher spatial resolution than was possible with the embodiment described in the patent.

Figure 2:
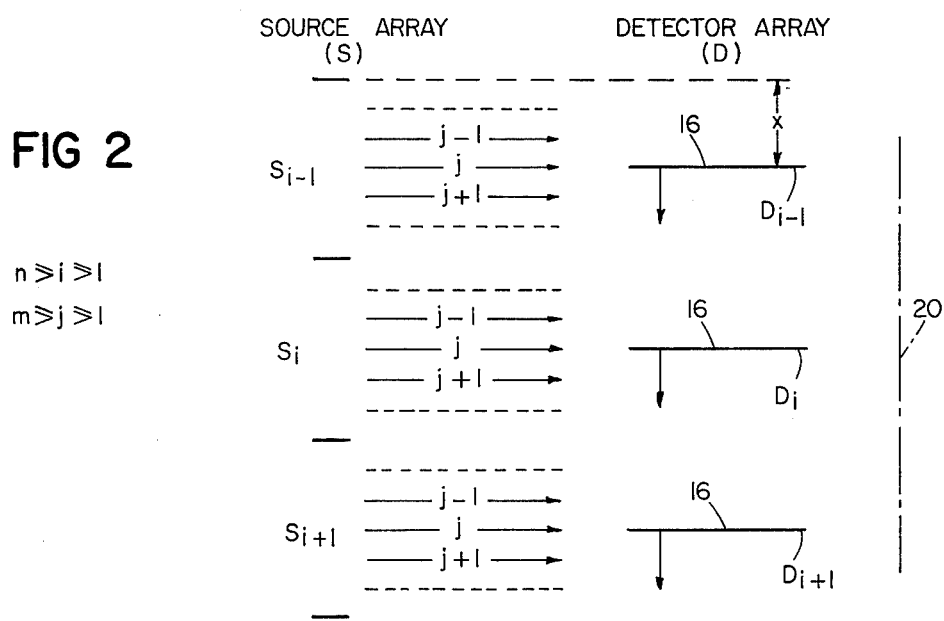
FIG. 2 is a diagram illustrating the spatial resolution achieved with the invention.

To better understand the effect of the lateral motion upon spatial resolution, assume that collimator 10 has n detectors 16. Each detector (Di) can be considered to be confronted at all times by m individual elements (Si, j) of source 22, each of which is to be resolved and determined. FIG. 2 shows how the n·m source elements are labelled, and their relationship to the detector array. As the detectors move along axis 20 relative to the source, the lateral displacement x for successive measurements assumes the value of successive integers in the range 0 to (m−1). Each combination of values of the two independent quantities x and i describes a flux measurement at one of the detector elements, and is represented by an equation having m right-hand-side terms, such as is shown below:

$$\left\langle \left. D_i \right\rangle_{i=1}^{i=n} = \left\langle \left\langle \sum_{j=x+1}^{j=m} Si,j + \sum_{j=1}^{j=x} Si+1,j \right\rangle_{x=0}^{x=m-1} \right\rangle_{i=1}^{i=n}$$

There will be a total of n·m equations defining the fluxes to all n detector elements for all m values of x. From these n·m equations one can reduce the strengths of all n·m source elements, giving a spatial resolution of n·m.

Figure 3:
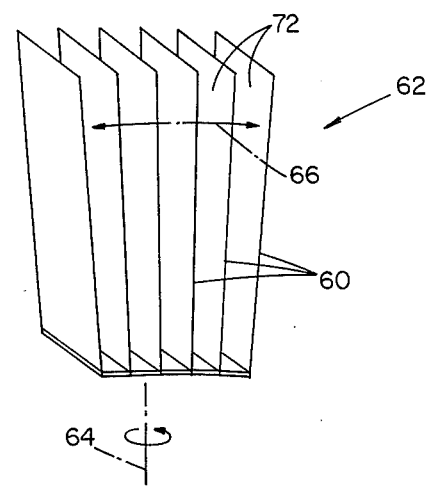
FIG. 3 is a diagrammatic view showing the invention embodied in a system of the type disclosed in U.S. Ser. No. 961,671.
Figure 4:
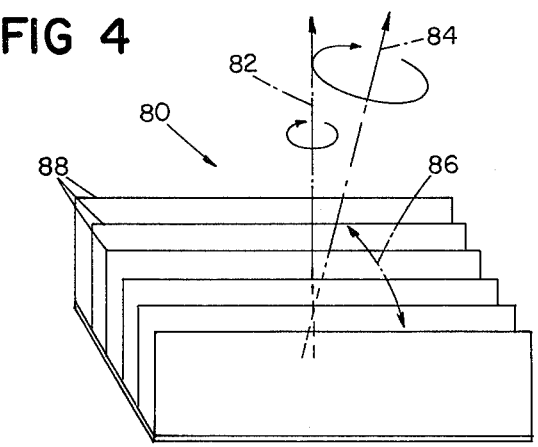
FIG. 4 is a diagrammatic view showing the invention embodied in a system of the type disclosed in U.S. Ser. No. 921,200.

In the same way, resolution can be increased for the embodiments of FIGS. 3 and 4.

In FIG. 3, as described in Ser. No. 961,671, sheets 60 of collimator 62 are divergent, and basic rotation is about axis 64. The lateral motion of this invention is along arc 66 of a circle centered on an axis (not shown) perpendicular to axis 64 and to the directions of transmission through slits 72, and parallel to sheets 60. Each sheet 60 extends along a radius of that circle. The analysis is as in FIG. 2, with angles substituted for distances.

In FIG. 4, the basic motion of the collimator 80 is about axes 82 and 84, as described in Ser. No. 921,200. The lateral motion of this invention is along arc 86 of a circle centered on an axis (not shown) perpendicular to axis 82 and the direction of transmission through the collimator, and parallel to sheets 88. Analysis is as in FIG. 3.

In each embodiment, the relative frequencies of the basic and lateral motion can be reversed, as suggested above, so that a complete cycle (e.g., 180° in FIG. 1) of the basic motion takes place between each of m steps of the lateral motion. The total number of measurements will be unchanged, e.g., 50 m for FIG. 1.

Moreover, the physical measurement process can be continuous, rather than discreet as disclosed. For example, one could simply record the time of arrival of each photon at each detector and, knowing the collimator position at each such time, process the data collected to achieve the equivalent of having made discreet measurements. More generally, any physical measurement system that gives a profile of photon flux over time will yield data useful for the invention.

Still other embodiments are within the following claims.

What is claimed is:

1. In imaging apparatus for improved resolution for determining the location of a source of radiation of unknown position comprising a slit collimator, means for imparting to said collimator a basic movement through a succession of different positions relative to said source of radiation, detector means for providing measurements of the radiation passing through the collimator in each of said positions, and means for processing data from said succession of measurements to gain information about said source, that improvement comprising means for superimposing upon said basic movement of said collimator a cyclic lateral movement of said collimator and said detector means transverse both to the direction of radiation transmission through said collimator and to the walls of said collimator defining said slits, and means for making a succession of said measurements during each cycle of said lateral movement.

2. Near field imaging apparatus according to claim 1 wherein said lateral movement is perpendicular to said walls.

3. Far field imaging apparatus according to claim 1 wherein said lateral movement is along an arc of a circle centered on an axis parallel to said walls and perpendicular to the direction of transmission through said collimator.

4. The improvement of claim 1 wherein the frequency of said lateral movement is higher than that of said basic movement, and said means for superimposing said lateral movement is operative between successive steps of said basic movement.

5. The improvement of claim 1 wherein the frequency of said basic movement is higher than that of said lateral movement, and said means for superimposing said lateral movement is operative in steps between cycles of said basic movement.

6. The improvement of claim 1 wherein the total excursion of each cycle of said lateral movement is at least the center-to-center distance between adjacent collimator slits.

* * * * *